United States Patent [19]

Demrick

[11] 4,283,810
[45] Aug. 18, 1981

[54] DUAL WHEEL CASTER BODY STRUCTURE

[75] Inventor: Carl J. Demrick, Birmingham, Mich.

[73] Assignee: Herder N.V., Willemstat, Netherlands Antilles

[21] Appl. No.: 16,095

[22] Filed: Feb. 28, 1979

[51] Int. Cl.³ .............................................. B60B 33/00
[52] U.S. Cl. .................................................... 16/47
[58] Field of Search ............... 16/18 CG, 20, 21, 22, 16/23, 46, 47, 48

[56] References Cited

U.S. PATENT DOCUMENTS

| 842,753 | 1/1907 | Bierd | 16/21 |
| 984,855 | 2/1911 | Schaffnit | 16/46 |
| 4,077,088 | 3/1978 | Melara | 16/47 |

*Primary Examiner*—Wm. Carter Reynolds
*Attorney, Agent, or Firm*—McWilliams, Mann, Zummer

[57] ABSTRACT

A dual wheel caster body construction wherein the caster body frame is fabricated from a pair of sheet metal stampings nested together at an integral swivel stem socket and secured together in the area of confronting plate portions with an axle bearing through the plate portions for an axle carrying supporting wheels on opposite sides of the plate portions and a wheel cover also fabricated from a sheet metal stamping supported on and secured to the body frame stampings.

9 Claims, 8 Drawing Figures

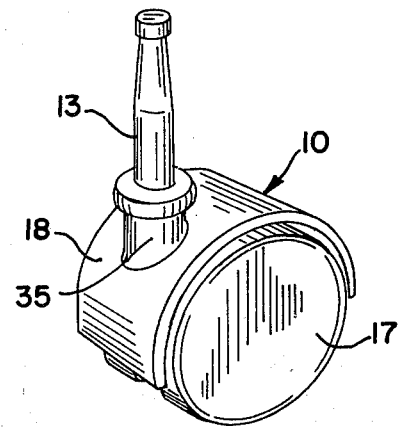
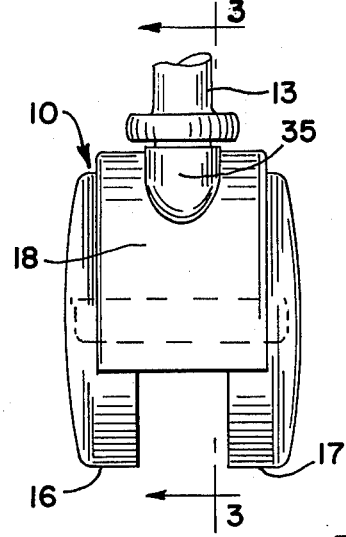

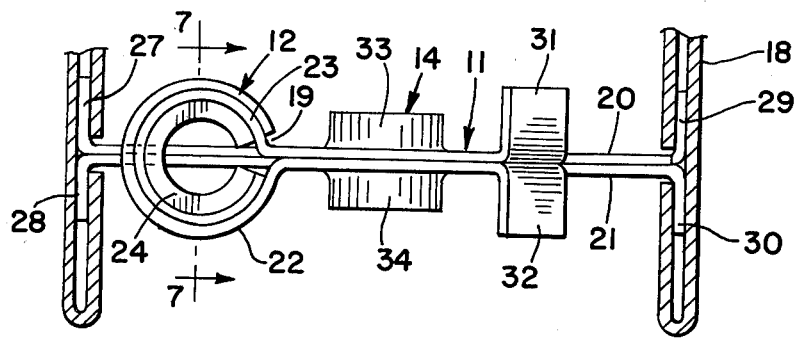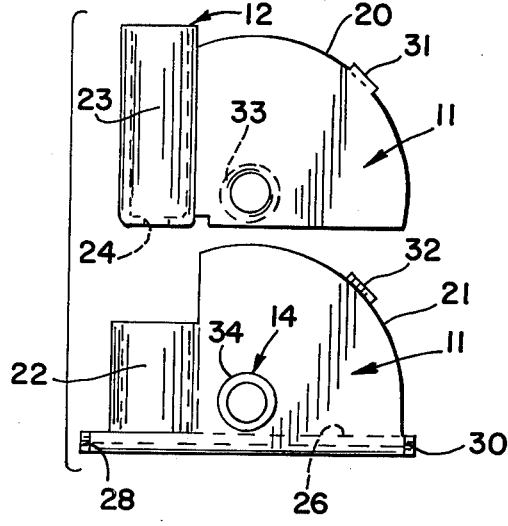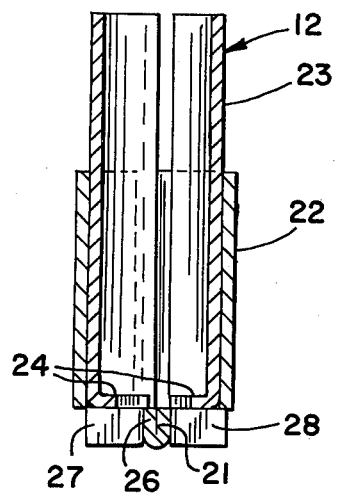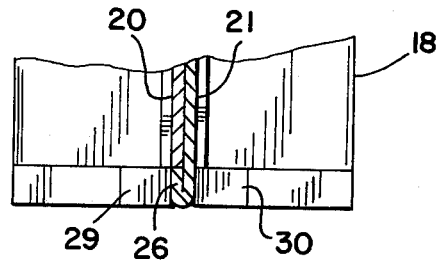

DUAL WHEEL CASTER BODY STRUCTURE

BACKGROUND OF THE INVENTION

Heretofore, two wheel casters have been available in the prior art but such casters utilized a die cast zinc body frame and wheel cover of integral construction and while certain casters have been known where the body frame was made from metal stampings, such casters mounted a supporting wheel on an inclined axle and with the body frame inclined at an angle to the vertical swivel stem mounting the caster in an article to be supported by the caster. The exposed body frame, axle and swivel stem socket were enclosed by hemispherical metal covers secured respectively to the body frame and to the wheel. Two wheel type casters have not been available heretofore where the body frame and wheel cover were fabricated from metal stampings. Consequently, prior casters of this type were more expensive to manufacture and were heavier for a given load. The amount of material in such casters was burdensome from a cost standpoint, especially with the constantly escalating cost of materials and as a consequence competitive advantages of casters of superior design have been on the verge of being lost to competitive casters and particularly, where U.S. patents expire, from foreign competition where the manufacturers are able, with lower labor costs as well as material costs, to furnish casters of proven design and performance from the disclosure of an expired U.S. patent and thus bring to market a good caster from a fully developed design, without incurring any of the development costs ordinarily entailed by such U.S. patentee in producing a caster of competitive quality. Such casters, of course, are sold for less than the price of the domestic product, which was developed and produced on the basis of all normal development costs being included in the sales price of the caster. In the face of this competition it has become imperative that the costs be reduced in producing casters of new and improved design and representing a superior structure fully capable of competing on the basis of price as well as quality.

SUMMARY OF THE INVENTION

This invention provides a caster wherein the manufacturing costs have been reduced by taking both weight and material out of the structure while providing a caster of greater strength capable of efficient and economical construction. This has been accomplished particularly by designing a caster structure which utilizes a body frame fabricated from metal stampings which incorporate a socket for a vertical swivel stem and a journal for an axle mounting a pair of supporting wheels on opposite sides of the body frame. The wheels are covered by a fender secured to the body frame and also made from a light weight metal stamping. The important improvements in this caster design are realized from the fabrication of the body frame and wheel cover from light weight metal stampings and mounting all of the parts including the cover, swivel stem and axle mounted wheels in assembled relation on the body frame. The parts might be made from other materials, for instance the wheel cover could be made from a suitable plastic material and the wheels, as shown, are both made from a plastic such as Zytel. The metal stampings not only give the caster a desirable aesthetic effect but more importantly provide the necessary strength while effecting a worthwhile reduction in the weight of the material used in the manufacture of the caster body structure and whereby the costs of producing the caster are reduced and enable the caster parts to be designed for easy fabrication.

OBJECTS OF THE INVENTION

The primary purpose of this invention is the provision of a two wheel type caster of low cost design, having light weight, while affording the required strength properties and which is easily fabricated.

The principal object of the invention is to provide a dual wheel caster having a body frame and a wheel cover fabricated from metal stampings.

An important object of the invention is the provision of a dual wheel caster having a body frame of two piece nested construction made from metal stampings.

Another object of the invention is to provide a dual wheel caster having a two piece body frame fabricated from metal stampings incorporating a vertical swivel stem socket having nested walls and a journal for a horizontal wheel axle.

A further object of the invention is the provision of a dual wheel caster having a body frame fabricated from two stampings with an integral swivel stem socket forming a part of each and nested together and wherein the stampings have flat plate areas to one side of the nested socket and forms a multi-ply body plate structure throughout a major area of the body frame.

A still further and more specific object of the invention is to provide a dual wheel caster having a multi-ply plate body frame structure fabricated from sheet metal stampings having flat plate areas adjoining a nested socket, the nested portions of which are integral with the respective plate areas that form such plies.

Still another object of the invention is the provision of a dual wheel caster having a multi-ply plate body frame and a wheel cover, each fabricated from sheet metal stampings and wherein the body frame incorporates plate portions forming such plies with an integral curved section on each portion cooperating to form a vertical swivel stem socket at one side of the body frame.

DESCRIPTION OF THE DRAWINGS

The foregoing and other and more specific objects of the invention are attained by the caster structure and arrangement illustrated in the accompanying drawings wherein FIG. 1 is a general perspective of a dual wheel caster constructed in accordance with the teachings of this invention;

FIG. 2 is a front elevational view of the caster;

FIG. 3 is a vertical sectional view through the caster assembly taken on the line 3—3 of FIG. 2;

FIG. 4 is a fragmentary sectional view taken on the line 4—4 of FIG. 3 illustrating the mounting of the wheel cover on the body frame;

FIG. 5 is an elevational plan view of the caster body frame with a modified wheel cover indicated in section as it is attached at opposite extremities of the frame;

FIG. 6 is an exploded view of the body frame structure parts showing the flat plate areas and the nestable socket forming portions;

FIG. 7 is a vertical sectional view through the swivel stem socket of the body frame, taken on the line 7—7 of FIG. 5; and FIG. 8 is a detail fragmentary view with a portion of the body frame plates in section taken on the line 8—8 of FIG. 3 showing one of the attachments of the wheel cover to the body frame.

DESCRIPTION OF PREFERRED EMBODIMENT

In the drawings a caster assembly 10 is disclosed as being comprised of a body frame 11, having a socket 12 for a swivel stem 13, a journal 14 for an axle 15 carrying a pair of supporting wheels 16 and 17 and a wheel cover, or fender 18. The swivel stem socket 12 is disposed vertically and the swivel stem 13 extends upwardly above the socket, as best indicated in FIG. 1, so that it is readily adaptable to entry in the usual mounting socket in an article to be supported by the caster. The socket 12 and the journal 14 are formed integrally with the body frame 11 and as best shown in FIG. 6, the body frame is comprised of two plate members 20 and 21 of the desired weight and thickness and each including a socket forming portion which, when nested together complete the socket. The plate 21 at its forward side is formed with a generally cylindrical socket portion, or well, 22 that is open at top and bottom. The plate 20 is formed at its forward side with a generally cylindrical socket 23 of greater vertical depth than the well portion 22.

The socket 23 is generally of an outside diameter similar to the inside diameter of the cylindrical well 22 and is adapted to be nested into the member 22 by insertion into the open top end thereof. It will be seen, that the cylindrical portion 22 of plate 21 does not form a complete, or closed cylinder, as best shown in FIG. 5, where it is apparent that the opening 19 extending full height of the portion 22 will enable the socket 23 to be slid into the cylinder portion 22 without interference. The socket well 22 and the socket 23 are each made by forming the respective plate portions 20 and 21 around suitable mandrels to provide the finished articles having the diameters required in the nesting portions to enable them to be fitted together to form the socket 12. While the well portion 22 is open at the bottom the socket 23 is formed with a bottom wall 24 partially closing the bottom end of the socket.

When the socket 23 is nested into the cylindrical well 22, the plate areas 20 and 21 are disposed in face-to-face relationship and secured together by spotwelds 25 thus providing a multi-ply construction of the body frame member 11. The socket 23 is of greater depth than the receiving cylindrical portion 22 but the plate 21 is of greater depth than the plate 20 and this greater vertical extent of plate 21 is utilized in the forming of a rebent flange 26 which extends entirely across the full extent of the plate 21 at the bottom and under the open bottom of the socket well 22. This provides a double thickness under the portion 22 because the plate 21 is also continued across this area to provide a corresponding portion complementing the rebent flange 26 in this area, as clearly illustrated in FIG. 7.

The double thickness of metal provides a stop and support for the socket 23 in the cylindrical well 22 while the rebent flange 26 provides a limit stop for the positioning of the plate 20 relative to the plate 21 when the socket structure and the plate portions are assembled. The double thickness of metal represented by the rebent flange 26 and the matching or corresponding portion of plate 21 are formed to provide oppositely extending flange portions 27 and 28, respectively, at the extremities beyond the cylindrical socket member 22 and at the opposite side of the body frame member 11 these same metal portions are found to provide similar flanges 29 and 30 whereby the opposite ends of the flange 26 and corresponding plate portion are similarly flanged in opposite directions. Each of the plates 20 and 21 is formed with an outstanding flange bracket 31 and 32 respectively, located at the upper edge of the respective plates providing support brackets engaged under the wheel cover 18 to brace the upper portion of the cover.

The axle bearing 14, as best shown in FIG. 5, is comprised of flanged collars 33 and 34 integral with the plates 20 and 21 and formed to extend in opposite directions outwardly from the respective plates to provide adequate bearing area for the axle 15. The wheels 16 and 17 are pressed onto opposite ends of the axle at opposite sides of the body frame 11 and are formed from a suitable plastic material such as Zytel. The wheels each rotate freely on the axle 15 so that, as described herein, when the caster swivels about mounting stem 13, the wheels are each free to rotate in either direction and thereby accommodate the various movements of the caster as it is moved about without incurring any resistance from the wheels as a result of skidding over a supporting surface, or resistance to turning of the caster, as might be the case if a fixed mounting of the wheels on the axle were used which would require the wheels to rotate together and the axle 15 to rotate in the bearing 14. Thus, the body frame is supported on the axle 15 between the wheels, which are spaced apart such as to clear the socket structure 22/23 as well. The swivel stem socket is adapted to receive the stem 13 as shown in FIGS. 1, 2 and 3, but the stem is not mounted directly in the socket 23. Instead, a bushing in accordance with application Ser. No. 7,480, filed Jan. 29, 1979, is installed in the socket 23 and the swivel stem 13 has its lower end inserted in and retained in the bushing which includes a shroud portion 35 that encloses the bushing where it extends above the wheel cover 18.

The wheel cover 18, as disclosed herein, may take either of the two forms illustrated. In FIGS. 3 and 4, the wheel cover is shown as comprising a two ply construction where the metal is folded back upon itself, as best shown in FIG. 4, to provide a double thickness substantially throughout the area of the wheel cover. At the inner side of the cover the inner ply is flanged inwardly adjacent to the center of the cover to provide spaced apart flanges 36 and 37 that embrace the body frame 11 in engagement with the respective plates 20 and 21. The wheel cover may be secured to the body frame by welding the flanges 36 and 37 in relation to the plates 20 and 21, if desired. However, the oppositely extending flanges 27 and 28 on the body frame at the socket side of the frame are provided for the purpose of direct attachment of the wheel cover by means of welding, or otherwise, as preferred. At the opposite side of the body frame, which is the rear side of the caster, the oppositely extending flanges 29 and 30 may similarly be secured in relation to the wheel cover.

As best shown in FIG. 5, a modified form of the wheel cover 18 is provided wherein the sheet metal of the cover is rebent to provide two thicknesses of metal that are spaced apart and wherein the central flanges 36/37 are eliminated. Instead, the flanges 27/28 and 29/30 on the body frame 11 are disposed between the spaced apart thicknesses of the cover at the opposite sides of the body frame to thereby mount the cover on the frame and make for a rigid assembly. Similarly, the outstanding flanges 31 and 32 projecting from the respective plates 20 and 21 adjacent the upper perimeter of the body frame 11 are adapted to be disposed between the metal thicknesses and bear on the inner side of the outermost thickness to support and brace the wheel cover in this area. Both forms of the wheel cover include an opening 38 through which the socket 23 extends above the cover, as best illustrated in FIG. 3. The shroud portion 35 of the plastic bushing mounted in the socket flares out around the upward extension of the socket to close the opening which otherwise might appear at this point.

The caster body construction described comprises two primary elements consisting of the body frame member and the separate wheel cover member both formed from metal stampings fabricated from sheet metal blanks and wherein the body frame member consists of two pieces nested together in the area of a vertical socket structure integral with the respective pieces and extending upwardly through the wheel cover for mounting a swivel stem in the caster and wherein the wheel cover is supported at an upper periphery position on the body frame and secured in operative relation to the body frame at the opposite extremities of such frame whereby the two elements are maintained in properly positioned relationship and with respect to a pair of supporting wheels disposed respectively upon opposite sides of the body frame and mounted on an axle extending through a supporting bearing in the frame.

From the foregoing it will be seen that a dual wheel caster has been provided which is of lighter weight, increased strength from stronger materials and more economical to manufacture, wherein the primary parts are made from sheet metal stampings including a body frame member made from two pieces nested together in the formation of an integrated swivel stem socket disposed vertically and an axle bearing on a horizontal axis to receive an axle carrying supporting wheels on respectively opposite sides of the body frame and having a separate wheel cover supported on and secured to the body frame and overlying the wheels.

What is claimed is:

1. A caster body structure comprised of a body frame member and a separate wheel cover member, said body frame member having multi-plate structure throughout a major portion of the member, a horizontal axle bearing formed in the multi-plate structure, a vertical swivel stem socket formed integrally as a part of each plate of said multi-plate structure and extending upwardly through said wheel cover member, one of said swivel stem sockets comprising a cylindrical well portion and the other swivel stem socket comprising a socket portion nested in such well portion, and a pair of supporting wheels mounted on an axle extending through said bearing, said multi-plate structure being disposed between said supporting wheels.

2. A caster body structure as set forth in claim 1 wherein said cylindrical well portion includes a vertically disposed opening in a wall thereof through which a part of said socket portion extends in the nested position.

3. A caster body structure as set forth in claim 1 wherein said plate structures are secured together to provide a rigid multi-ply body frame structure.

4. A caster body structure as set forth in claim 3 wherein one of the plates includes a rebent flange underlying the other plate to provide a locating limit stop for positioning the plates relative to each other.

5. A caster body structure as set forth in claim 4 wherein said rebent flange and a corresponding portion of said one plate extends under said cylindrical well to define the vertical position of said socket in the well.

6. A caster body structure as set forth in claim 5 wherein said rebent flange and said corresponding portion are flanged to extend in opposite directions beyond said cylindrical well, and the opposite ends of the rebent flange and such corresponding portion are similarly flanged in opposite directions.

7. A caster body structure as set forth in claim 6 wherein said wheel cover member is of multi-wall construction and said oppositely extending flanges at both ends of the plate structure are secured to the wheel cover for mounting the wheel cover on the body frame member, and one or more support brackets on the body frame engaged under the wheel cover to brace the upper portion of the cover.

8. A caster body structure as set forth in claim 6 wherein said wheel cover member is of multi-wall construction and includes a pair of spaced apart inwardly directed flanges disposed upon respectively opposite sides of the body frame member, and means securing the wheel cover member to the body frame member.

9. A caster body structure as set forth in claim 1 wherein said body frame plate structures and said wheel cover member are fabricated from metal stampings formed from sheet metal.

* * * * *